United States Patent [19]
Malon et al.

[11] 3,825,672
[45] July 23, 1974

[54] DEVICE EMITTING OR RECEIVING ELECTRICAL SIGNALS RESULTING FROM THE MOVEMENT OF A VEHICLE ALONG THE DEVICE

[76] Inventors: Jean-Pierre Malon, 32, Domaine de Chateau-Gaillard, 94-Maisons Alfort; Joseph Andre Loreau, 49, rue ARCEL Bourbarias, 94 -Alfortville,, France

[22] Filed: May 13, 1971

[21] Appl. No.: 143,164

[30] Foreign Application Priority Data
May 13, 1970 France .............................. 70.17502

[52] U.S. Cl. .......................... 174/97, 317/5, 340/47
[51] Int. Cl. ............................................. B61l 1/02
[58] Field of Search ................. 174/96, 97; 24/73 B; 340/22, 31, 47, 48

[56] References Cited
UNITED STATES PATENTS
3,391,432   7/1968   DuRocher............................ 174/97

FOREIGN PATENTS OR APPLICATIONS
1,579,467   7/1969   France
80,273   11/1955   Denmark............................ 24/73 B

*Primary Examiner*—J. D. Miller
*Assistant Examiner*—Harry E. Moose, Jr.
*Attorney, Agent, or Firm*—Weiser & Stapler

[57] ABSTRACT

The device includes cables along the path of a vehicle to transmit signals to this vehicle or receive them by induction. These cables are fixed on a band of flexible and elastic material. The cables can thus be fixed to the band in the factory and the positioning of the band with its cables in place can be effected by unwinding from a spool and fixing the band on a support by means of clamps. The device is particularly useful for automatic piloting of metropolitan trains.

6 Claims, 4 Drawing Figures

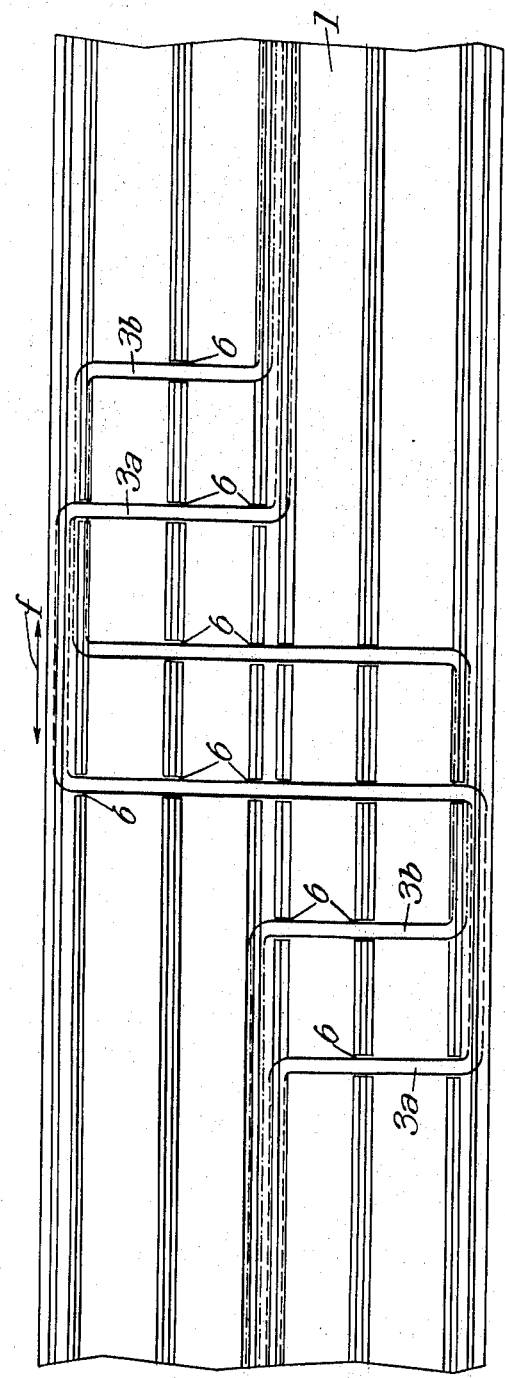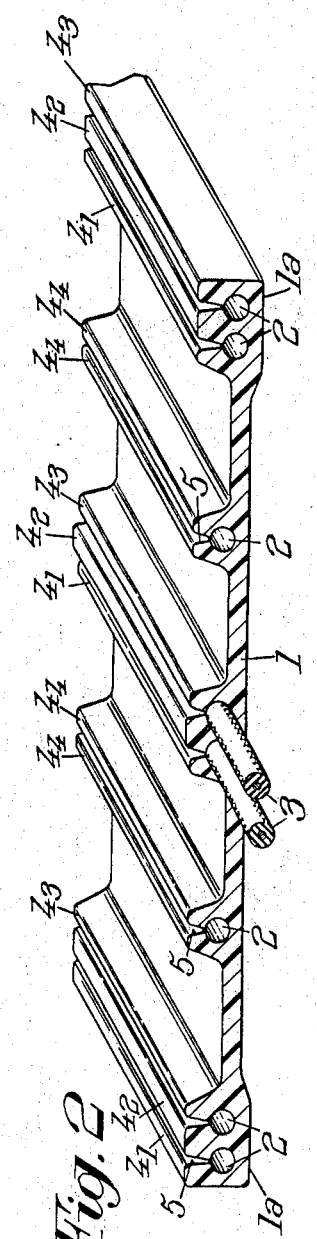

DEVICE EMITTING OR RECEIVING ELECTRICAL SIGNALS RESULTING FROM THE MOVEMENT OF A VEHICLE ALONG THE DEVICE

The invention relates to a device emitting or receiving electrical signals as a result of the movement of a vehicle along this device, this device including one or several electrical cables or wires which extend in a general direction parallel to the movement of the vehicle but have, at predetermined places, portions extending transversely (perpendicularly or obliquely) to the said general direction, so that at these predetermined places signals are produced by induction. These signals, when they are emitted by the device and received by the vehicle, can serve for piloting, especially automatic piloting of the vehicle, the cables then being programming cables, whilst if the signals are received by the device they can, once transmitted to a receiving station, obtain indications on the speed of the vehicle, the momentary place which it has reached, etc., the cables then being information cables.

Hitherto, these cables have been placed directly along the path followed by the vehicle. When it relates to a train, the cables are placed between the rails or beside the latter. The positioning of such cables was a long and difficult operation to accomplish. The long duration of positioning, not only involved considerable positioning costs, but constituted also a considerable handicap to traffic. Moreover, it was difficult to position the cables with the necessary accuracy.

It is an object of the invention to overcome these drawbacks.

The device according to the invention is characterized principally by the fact that one or several cables, which relate to programming cables or information cables, are fixed on a band of flexible material which, with the cables fixed thereon, can be rolled or folded for its transportation to the place of positioning and unrolled and unfolded at this place to be fixed in a position in which it extends parallel to the path of the vehicle which has to receive or produce signals during its movement along the band.

In this way, the band can be prepared with its cable or cables at the factory where it is easy to fix cables on the band with the desired accuracy. At the place of positioning, it suffices then to unroll or unfold the band with its one or more cables and to ensure the fixing of the band on a support. The operation can be effected rapidly, so that impediment to traffic is reduced to the minimum. Generally, the positioning can be effected during non-busy periods when there is little or no traffic. By means of the invention, several kilometers of cables can be positioned in several hours.

The device according to the invention so enables the changing easily of the programming or information supplied by the one or more cables especially where it relates to changing the programming or information only over a portion of the route of the vehicle. It suffices then to lift off the portion of the device comprising the cables according to the old programming or information and to replace them by a band prepared at the factory and of which the cables correspond to the new programming or to the new information.

Preferably, the material constituting the band is not only flexible but also elastic. This material can be constituted by a plastics material such as polyvinyl chloride or natural or synthetic rubber. In any case, there is advantageously selected a material which has a low coefficient of thermal expansion, so that the accuracy of positioning the cables is not affected by variations in ambiant temperature.

In a particularly advantageous embodiment of the invention, there is provided, on the band, on the side where the one or more cables have to be fixed, housings whose cross-section corresponds to the cross-section of the cables which have to be placed in these housings, these housings comprising longitudinal slots whose cross-section is less than the cross-section of the housings proper but, which, due to the elasticity of the material constituting the band, can be enlarged in order to allow the cables to pass, through these slots, to the housings. These insertion slots, once the cables are in position, again retract, so that the cables are firmly held in place inside their housing.

This construction, not only enables the holding in place of the cables, but also their replacement on the same band by cables ensuring another programming or another information.

The accompanying drawings show a preferred embodiment of a band comprising programming cables and its fixing on the cross-members of a railroad.

FIG. 1 shows a section of band constructed according to the invention with the cables incorporated in this band.

FIG. 2 shows a section in cross-section and in perspective.

Figure 3:
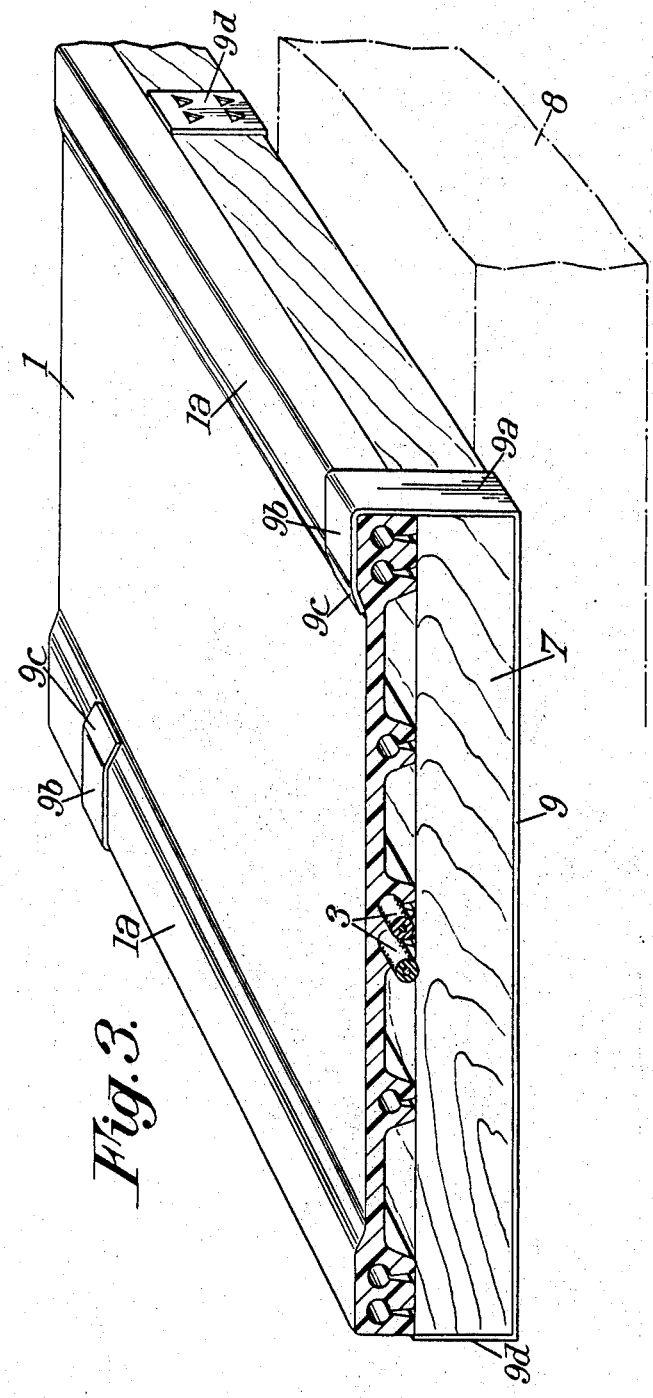
FIG. 3 shows, in cross-section and in perspective, the fixing of the band on the cross-members of a railway.
Figure 4:
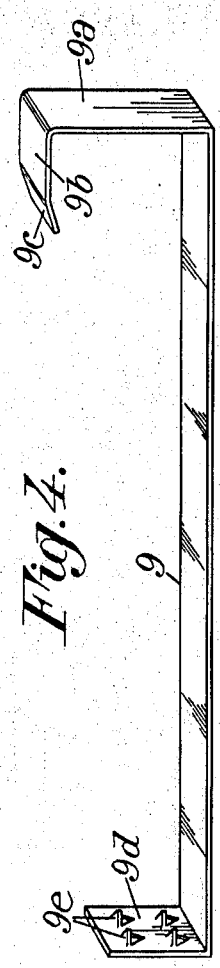

FIG. 4 lastly shows in perspective one of the clamps which serve for the fixing shown in FIG. 3.

In FIGS. 1 to 3, there is denoted by 1 a section of band of flexible and elastic material, for example, rubber or of plastics material such as polyvinyl chloride. The longitudinal direction of this band is indicated, in FIG. 15 by an arrow $f$. The band 1 bears, in FIG. 2, on one of its sides, a plurality of shaped ribs which form between them housings 2 in which can be placed the electrical cables or wires 3.

In the embodiment shown by the drawings, there is provided, close to each of the longitudinal edges and to the center of the band 1, three ribs $4_1$, $4_2$, $4_3$ which form two housings 2. To this end, each of the ribs $4_1$ and $4_3$ has a unilaterally enlarged head with respect to its base, whilst each of the ribs $4_2$ occurring between the ribs $4_1$ and $4_3$ has an enlarged top on both sides of its base. Moreover, the band 1 includes also, at places situated between its edges and its center, pairs of ribs $4_4$ having the same shape as the ribs $4_1$ and $4_3$ and forming between them a single housing 2 for a cable.

Between the enlarged tops of the said ribs exists a longitudinal slot 5 which, due to the elasticity of the material which forms the band, can be enlarged temporarily to enable the introduction of a cable 3 into the housing 2.

Preferably, the band 1 with its ribs which form the housings 2 is obtained in a single operation by extrusion.

FIG. 1 shows, by way of example, the path of two cables $3_a$, $3_b$ which are fixed in the band 1 by means of the above-mentioned ribs. It is assumed that these cables serve for the automatic piloting of a train, which piloting is as described by French Pat. No. 1,579,467. Each of these cables serves for the production, in the train to be piloted, of a signal as soon as the detectors provided under this train, pass over the place where these cables are transversely deviated, for example, perpendicularly, with respect to the longitudinal direction of the band. In order that the ribs 4 should not impede the passage of the portions of the cable which are transverse to the direction of the band, these ribs are cut-out at the places 6 where the said portions of the cable cross the ribs.

The fixing on the band of the cables having the shape necessitated for the required purpose (automatic piloting, obtaining of information on the progress of the train, etc.) takes place in the factory where this fixing can be effected with the desired accuracy. Then, the assembly of the band with the cables is rolled and transported in the form of a spool to the place where the positioning of the cable has to take place.

Instead of winding the band to form a spool, it can also be folded provided that the radii of the folds are sufficiently large to prevent the production of deformations difficult to remove.

The wound band having arrived at the place where it must be positioned is unwound and fixed on a support. If it relates to fixing the band between the rails of a railway, for example, a metropolitan railroad, for the purpose of automatic piloting of the trains, recourse is preferably had to means shown in FIGS. 3 and 4.

In FIG. 3, the band 1 with its cables 3 incorporated is placed with its grooves 4 downwardly on a plate 7 which extends longitudinally between the rails and which is fixed itself on cross-members 8. The fixing of the band 1 is ensured by metallic clamps 9 (FIG. 4) which have a generally U-shaped cross-section. One of the wings, namely the wing $9_a$, of these clamps includes a nose $9_b$ whose end $9_c$ is slightly inclined downwardly. The top of each of the longitudinal edges of the band 1 forms a sort of beading $1_a$ of which the shape corresponds to that of the nose $9_b$, $9_c$ of the clamps 9. The other wing $9_d$ of the clamps 9 includes for example points $9_e$ formed by punctures produced in the wing $9_d$ and which can penetrate into one of the sides of the plate 7. The fixing of the band on the plate 7 by means of these clamps is obtained by disposing alternately the clamps 9 with the wings $9_a$ to the right and to the left as indicated by FIG. 3. The noses $9_b$, $9_c$ of the wings $9_a$ then hold the band 1 firmly against the plate 7.

Of course, instead of ensuring the fixing of the wings $9_d$ of each of the clamps to the plate 7 by means of the points $9_e$, use could be made of nails passing through holes in the wing $9_d$.

There is obtained a rapid positioning of the cables 3 along the railway.

When the circulation of trains over this railway is stopped during certain nocturnal hours, as is the case for the Parisian metropolitan train, there may, by means of the invention, be positioned, during this interruption of traffic, a kilometer of cable and even more in a single night.

As already stated, the invention can serve for the most varied applications. There may be mentioned, by way of example and in addition to the application to the automatic piloting of trains, the use of the device according to the invention for the measurement of the speed of a vehicle or train or for the obtaining of information on the position that a vehicle or a train has reached at any moment.

As is self-evident and as emerges already from the foregoing, the invention is in no way limited to those of its methods of application, nor to those of its methods of production of its various parts, which have been more especially envisaged; it encompasses on the contrary, all variations.

I claim:

1. A device responsive to the movement of a vehicle along said device to emit or receive electrical signals, said device comprising:
   at least one electrical conductor means, said conductor means extending generally in a direction parallel to said vehicle movement, and said conductor means having spaced portions deviating laterally from said direction, and responsive to said vehicle movement to produce said electrical signals by induction; and
   a band of flexible material on which said conductor means is fixed,
   said band extending continuously in said direction substantially coextensively with said conductor means,
   said band having upstanding from at least one surface a plurality of pairs of ribs, different adjacent pairs providing different channels for said conductor means, said ribs also extending continuously in said direction substantially coextensively with said conductor means, except for cut-outs permitting said laterally deviating portions to extend laterally from one channel to another,
   and said band and ribs being constructed and arranged with such flexibility that they can be transported in longitudinally folded or rolled condition, and unfolded or unrolled to extend in said direction.

2. Device according to claim 1, wherein said ribs are shaped by ribs forming between them, near their bases a channel whose cross-section corresponds to the cross-section of the conductor means, and, near their free ends, an entry slot enabling, when the ribs are elastically separated, the insertion of the conductor means into said channel.

3. Device according to claim 1, wherein said band is positioned on a plate and fixed on said plate by clamps having the general shape of a "U," one of the wings of each said clamp passing over the top of the band, whilst the other wing is fixed in one of the lateral edges of the plate.

4. The device of claim 1, wherein said conductor means is in the form of a plurality of electrical cables.

5. The device of claim 1, wherein said material is both flexible and elastic and is selected from the group of materials formed of rubber, polyvinyl chloride, other elastomers, and plastics.

6. An electrical conductor positioning device comprising:
   at least one electrical conductor means, extending generally in a predetermined direction and having spaced portions deviating laterally from said direction; and
   a band of flexible material on which said conductor means is fixed,
   said band extending continuously in said direction substantially coextensively with said conductor means, said band having upstanding from at least one surface a plurality of pairs of ribs, different adjacent pairs providing different channels for said conductor means, said ribs also extending continuously in said direction substantially coextensively with said conductor means, except for cut-outs permitting said laterally deviating portions to extend laterally from one channel to another;

and said band and ribs being constructed and arranged with such flexibility that they can be transported in longitudinally folded or rolled condition, and unfolded or unrolled to extend in said direction.

* * * * *